United States Patent
Kinoshita et al.

(10) Patent No.: US 7,706,240 B2
(45) Date of Patent: Apr. 27, 2010

(54) OPTICAL DISK AND ITS MANUFACTURING METHOD

(75) Inventors: Toshiro Kinoshita, Tokyo (JP); Akihiko Kobayashi, Saitama (JP); Noboru Sasaki, Fukuoka (JP); Makoto Arisawa, Asaka (JP); Hiroshi Iwase, Oumihachiman (JP); Mamoru Sekiguchi, Kawaguchi (JP); Hiroshi Ogawa, Yokohama (JP); Yoshimori Yamasaki, Kawasaki (JP); Kiyoshi Osato, Chiba (JP); Masanobu Yamamoto, Yokohama (JP); Toshiyuki Kashiwagi, Tokyo (JP)

(73) Assignees: Toppan Printing Co., Ltd., Tokyo (JP); Sony Corporation, Tokyo (JP)

(*) Notice: Subject to any disclaimer, the term of this patent is extended or adjusted under 35 U.S.C. 154(b) by 1045 days.

(21) Appl. No.: 10/543,140

(22) PCT Filed: Jan. 30, 2004

(86) PCT No.: PCT/JP2004/000929

§ 371 (c)(1),
(2), (4) Date: Jul. 25, 2005

(87) PCT Pub. No.: WO2004/068484

PCT Pub. Date: Aug. 12, 2004

(65) Prior Publication Data

US 2006/0133256 A1 Jun. 22, 2006

(30) Foreign Application Priority Data

Jan. 30, 2003 (JP) ............... 2003-022307
Nov. 17, 2003 (JP) ............... 2003-386539

(51) Int. Cl.
*G11B 7/24* (2006.01)

(52) U.S. Cl. .................................... 369/275.1
(58) Field of Classification Search ............ None
See application file for complete search history.

(56) References Cited

U.S. PATENT DOCUMENTS 6,353,592 B1   3/2002   Kashiwagi et al.

(Continued)

FOREIGN PATENT DOCUMENTS

EP   0 790 278   8/1997

(Continued)

OTHER PUBLICATIONS

Supplementary European Search Report issued in corresponding European Patent Application No. 04706838.2, on Feb. 20, 2008.

(Continued)

*Primary Examiner*—Joseph H Feild
*Assistant Examiner*—Henok G Heyi (57) ABSTRACT

An optical disk (10) of the present invention has a substrate (11) included a resin-impregnated paper, in which resin is impregnated into paper, or resin-coated paper, in which the paper surface is coated with a resin, and a recording layer (13) formed on at least one side of the substrate (11). This type of optical disk (10) has performance equal to that of conventional optical disks and has a minimal effect on the environment during disposal. In addition, a manufacturing method of an optical disk of the present invention has a recording layer sheet fabrication step in which a recording layer sheet is fabricated by forming tracks on a recording layer base material, and a recording layer sheet lamination step in which a recording layer (13) included the recording layer sheet is provided on a substrate (11) included resin-impregnated paper or resin-coated paper by laminating the recording layer sheet with the resin-impregnated paper in which a resin is impregnated into paper or the resin-coated paper in which surface of the paper is coated with a resin. This type of manufacturing method of an optical disk allows optical disk (10) to be produced inexpensively.

15 Claims, 5 Drawing Sheets

U.S. PATENT DOCUMENTS

| | | |
|---|---|---|
| 6,951,027 B2 * | 9/2005 | Kikuchi et al. ............... 720/718 |
| 7,371,708 B2 * | 5/2008 | Arai et al. .................... 503/201 |
| 2003/0053404 A1 | 3/2003 | Kondo |
| 2004/0043154 A1 * | 3/2004 | Ichikawa et al. ............. 427/355 |
| 2004/0058817 A1 * | 3/2004 | Ueno et al. .................. 503/201 |
| 2004/0115556 A1 * | 6/2004 | Nakamura .................. 430/200 |
| 2005/0099479 A1 * | 5/2005 | Mizutani et al. ............. 347/103 |
| 2005/0233173 A1 * | 10/2005 | Odamura et al. ............. 428/800 |
| 2006/0073312 A1 * | 4/2006 | Hattori .................... 428/195.1 |

FOREIGN PATENT DOCUMENTS

| | | |
|---|---|---|
| JP | 5-258349 | 10/1993 |
| JP | 07-032776 | 2/1995 |
| JP | 07-040688 | 2/1995 |
| JP | 07-266771 | 10/1995 |
| JP | 09-231337 | 9/1997 |
| JP | 11-070630 | 3/1999 |
| JP | 11-185291 | 7/1999 |
| JP | 11-198575 | 7/1999 |
| JP | 2000-11448 | 1/2000 |
| JP | 2000-030302 | 1/2000 |
| JP | 2001-250353 | 9/2001 |
| JP | 2002-351291 | 12/2002 |
| JP | 2002-352474 | 12/2002 |
| JP | 2002-367234 | 12/2002 |
| WO | 00/18531 | 4/2000 |
| WO | 00/48172 | 8/2000 |

OTHER PUBLICATIONS

Japanese Office Action issued on Oct. 21, 2008 in corresponding Japanese Patent Application No. 2005-504774.

Japanese Notice of Allowance issued on Jun. 9, 2009 in corresponding Japanese Patent Application 2005-504774.

* cited by examiner

OPTICAL DISK AND ITS MANUFACTURING METHOD

TECHNICAL FIELD

The present invention relates to an optical disk such as a Blu-ray disk (BD) or digital versatile disk (DVD) and manufacturing method of the same.

BACKGROUND ART

Polycarbonate, epoxy resin and so forth have frequently been used as the substrate materials of conventional optical disks since these substrate materials are required to have low contents of extraneous materials and impurities, high permeability and low double refractive index to enable stable reading and writing, a low moisture absorption rate and superior heat resistance to prevent deformation of the optical disk, as well as high fluidity and superior mold release to facilitate molding processing (Japanese Unexamined Patent Application, First Publication No. 05-258349).

However, since bisphenol A is used as monomer for the aforementioned polycarbonate and epoxy resin substrate materials, unreacted bisphenol A remained even after polymerization. Due to the growing interest in environmental issues in recent years, materials containing bisphenol A have tended to be shunned, and studies have been conducted on substrate materials that do not contain bisphenol A.

The use of glass has been considered for use as a substrate material since it does not contain bisphenol A and satisfactory optical characteristics in the form of high transmittance. However, glass substrates have problems in terms of strength in that they are unable to accommodate the pressure and stress during production and use due to limitations on disk thickness.

Another problem with conventional optical disks is that, although silk screen printing has mainly been used in the case of printing characters or images on the surface, there is the problem of the difficulty in obtaining highly detailed images with silk screen printing.

In addition, in the case of silk screen printing, in order to print serial numbers or other different characters and images for each disk, it is necessary to change the form plate each time, thereby resulting in the problem of being unable to in fact impart variable information by printing to conventional optical disks.

Accordingly, an object of the present invention is to provide an optical disk, and manufacturing method of the same, which has performance equal to that of conventional optical disks and has a minimal effect on the environment during disposal.

In addition, another object of the present invention is to provide an optical disk on which highly detailed images are printed, and manufacturing method of an optical disk that enables highly detailed images to be printed inexpensively and impart variable information by printing.

DISCLOSURE OF THE INVENTION

An optical disk of the present invention has a substrate included resin-impregnated paper in which a resin has been impregnated into paper or resin-coated paper in which the paper surface has been coated with a resin, and a recording layer provided on at least one side of the substrate. Since this type of optical disk uses resin-impregnated paper in which a resin has been impregnated into paper or resin-coated paper in which the paper surface has been coated with a resin for the substrate, it has a minimal effect on the environment during disposal while having performance equal to that of conventional optical disks.

Here, the centerline average roughness Ra of at least one side of the substrate is preferably 0.5 µm or less, and the maximum roughness Rmax is preferably 6.0 µm or less.

In addition, if a printing layer is additionally provided on the side opposite from the side of the substrate provided with the recording layer, then water absorption and moisture absorption of the substrate can be suppressed, and warping and other deformation of the optical disk can be suppressed.

Similarly, if the aforementioned recording layer is provided on both sides of the substrate, then water absorption and moisture absorption of the substrate can be suppressed, and warping and other deformation of the optical disk can be suppressed.

In addition, if the substrate additionally has a protective layer that protects the aforementioned recording layer, then together with preventing scratching of the recording layer, water absorption and moisture absorption of the substrate can be further suppressed, and warping and other deformation of the optical disk can be further suppressed.

In addition, if the aforementioned recording layer has a recording layer base material that serves as a support for the recording layer, and that recording layer base material includes a non-hydrophilic film, then the water absorption and moisture absorption of the substrate can be further suppressed, and warping and other deformation of the optical disk can be further suppressed.

In addition, if the aforementioned printing layer has a printing base material that serves as a support for the printing layer, and that printing base material includes a non-hydrophilic film, then the water absorption and moisture absorption of the substrate can be further suppressed, and warping and other deformation of the optical disk can be further suppressed.

In addition, if a release layer is provided between the substrate and the recording layer and/or printing layer, since the substrate and recording layer and/or printing layer can be separated and disposed of separately at the time of disposal, each layer can be disposed of in accordance with the material of which it is made, thereby making it possible to further reduce the effect on the environment.

In addition, manufacturing method of an optical disk of the present invention has a recording layer sheet fabrication step in which a recording layer sheet is fabricated by forming tracks on a recording layer base material; and, a recording layer sheet lamination step in which a recording layer included the recording layer sheet is provided on a substrate included resin-impregnated paper or resin-coated paper by laminating the recording layer sheet with resin-impregnated paper in which a resin is impregnated into paper or resin-coated paper in which the surface of the paper is coated with a resin.

In addition, manufacturing method of an optical disk of the present invention also preferably has a printing sheet fabrication step in which a printing sheet is fabricated by carrying out printing on a printing base material; and, a printing sheet lamination step in which a printing layer included the printing sheet is provided on a substrate composed of resin-impregnated paper or resin-coated paper by laminating the printing sheet with resin-impregnated paper in which a resin is impregnated into paper or resin-coated paper in which the surface of the paper is coated with a resin.

In addition, the manufacturing method of an optical disk of the present invention also preferably has a protective film lamination step in which a protective layer included a protective film is provided on the recording layer by laminating the protective film onto the recording layer.

In addition, the manufacturing method of an optical disk of the present invention also preferably has a release layer formation step in which a release layer is formed on at least one side of the resin-impregnated paper or resin-coated paper in advance.

In this type of the manufacturing method of an optical disk, since the substrate, recording layer and as necessary, printing layer and protective layer, are formed by prefabricating their corresponding sheets followed by their lamination, an optical disk having little substrate warping can be produced inexpensively.

In addition, since the method has fabricating a printing sheet by carrying out printing on a printing base material in advance followed by laminating it to the substrate, highly detailed images can be obtained inexpensively. In addition, variable information, such as sequentially changing serial numbers, that differs for each disk can be imparted by printing onto the optical disk.

BRIEF DESCRIPTION OF THE DRAWINGS

FIG. 7 is a schematic drawing showing (a) a printing sheet fabrication step, (b) a substrate sheet fabrication step, and (c) a recording layer sheet fabrication step.

BEST MODE FOR CARRYING OUT THE INVENTION

An optical disk of the present invention has a substrate composed of resin-impregnated paper in which a resin is impregnated into paper or resin-coated paper in which the surface of the paper is coated with a resin, a recording layer provided on at least one side of said substrate, and as necessary a printing layer or different recording layer on the side opposite from the side of the substrate provided with the recording layer, and additionally as necessary a release layer between the substrate and the recording layer.

Specific examples of the layer composition of an optical disk of the present invention include: (1) recording layer/substrate, (2) recording layer/substrate/printing layer, (3) recording layer/substrate/recording layer, (4) protective layer/recording layer/substrate/printing layer, (5) protective layer/recording layer/substrate/protective layer, (6) protective layer/recording layer/substrate/recording layer/protective layer, (7) protective layer/recording layer/release layer/substrate/printing layer, (8) protective layer/recording layer/release layer/substrate/release layer/printing layer, and (9) protective layer/recording layer/release layer/substrate/release layer/recording layer/protective layer. Here, a pressure-sensitive adhesive layer for laminating each layer may be provided between each layer as necessary. In particular, that having a recording layer on one side of the substrate and a printing layer on the other side, or that having a recording layer on both sides of the substrate are preferable since the water absorption and moisture absorption of a substrate composed of resin-impregnated paper can be suppressed as a result of both sides of the substrate being covered.

The following provides an explanation of an optical disk having the layer composition of (4) above with reference to the drawings.

Figure 1:
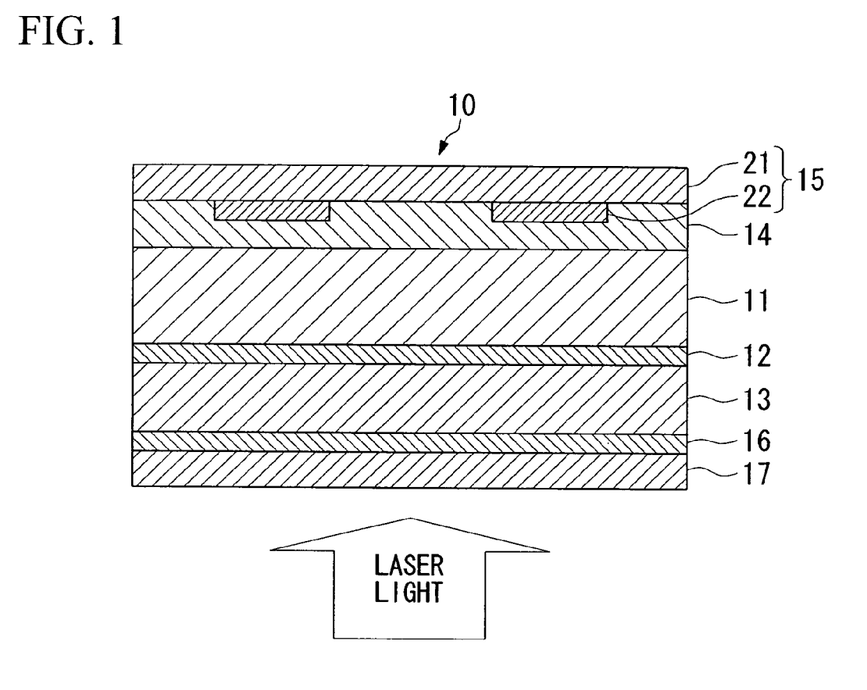
FIG. 1 is a schematic cross-sectional view showing an example of an optical disk of the present invention.

FIG. 1 is schematic cross-sectional view showing an example of an optical disk of the present invention. This optical disk 10 is roughly composed of a substrate 11 composed of resin-impregnated paper or resin-coated paper, a recording layer 13 laminated on one side of substrate 11 with a pressure-sensitive adhesive layer 12 interposed between, a printing layer 15 laminated on the other side of substrate 11 with a pressure-sensitive adhesive layer 14 interposed between, and a protective layer 17 laminated on recording layer 13 with a pressure-sensitive adhesive layer 16 interposed between.

<Substrate>

Substrate 11 retains strength required for use as an optical disk, and is required to have rigidity, moisture resistance and water resistance. Consequently, in the present invention, resin-impregnated paper in which a resin is impregnated into paper or resin-coated paper in which the surface of the paper is coated with a resin is used for the substrate. Since the paper functions as a reinforcing material, resin-impregnated paper and resin-coated paper have adequate rigidity, and since the paper is impregnated with resin or the surface of the paper is coated with a resin, it has moisture resistance and water resistance, superior dimensional stability, little warping and satisfactory surface smoothness. In addition, since the material uses paper, it can be easily disposed of by incineration and so forth, and there is little effect on the environment at this time.

(Resin-Impregnated Paper)

There are no particular limitations on the paper of the resin-impregnated paper provided it is a paper that uses pulp. Examples of such paper include 100% virgin pulp paper, coated board paper containing used paper, and paper that has been clay-coated on one side. In addition, this paper may also be paper produced from wood chips instead of pulp, as well as paper produced from non-wood materials such as kenaf. Moreover, vulcanized fibers may also be used in which the pulp has been bound in gluey form with zinc chloride and so forth. The apparent specific gravity (basis weight) of these papers is preferably 20 to 600 g/m$^2$ in consideration of the rigidity of the resin-impregnated paper, the ease of impregnation of resin into the paper.

There are no particular limitations on the resin of the resin-impregnated paper provided it does not contain bisphenol A. Examples of such resins include urea formaldehyde resin; melamine resin; polyamide amine and its epichlorhydrin denatured form; latexes such as natural rubber latex and synthetic rubber latex (such as SBR, NBR, or polychloroprene); polyvinyl chloride and copolymers of vinyl chloride and other monomers; polyvinylidene chloride and copolymers of vinylidene chloride and other monomers; acrylic resin; polyester; and polyolefins such as polyethylene and polypropylene.

In addition, the resin of the resin-impregnated paper may be a polyisocyanate resin obtained by impregnating polyisocyanate into paper and allowing the polyisocyanate to react with the moisture in the paper. Examples of polyisocyanates include aromatic diisocyanates such as phenylene diisocyanate (PDI), tolylene diisocyanate (TDI), naphthalene diisocyanate (NDI), 4,4'-diisocyanate diphenylmethane (MDI), or tetramethylxylene diisocyanate; aromatic aliphatic diisocyanates such as xylylene diisocyanate (XDI); hydrogenated TDI, hydrogenated MDI, and hydrogenated XDI; aliphatic or alicyclic diisocyanates such as hexamethylene diisocyanate (HMDI) and isophorone diisocyanate and their polyol derivatives or their burette forms; trimers of the aforementioned diisocyanates; trifunctional isocyanates such as lysine triisocyanate (LTI) and triphenylmethane triisocyanate; and oligomers or polymers having an isocyanate group.

In addition, the resin of the resin-impregnated paper may be a silane resin obtained by impregnating a silane coupling agent into paper and allowing the silane coupling agent to react with moisture in the paper in the presence of an acid catalyst. In addition, a polyol may be added to the silane coupling agent and the silane coupling agent may then be allowed to react therewith. Examples of silane coupling agents include ethyl trimethoxysilane, tetraethoxysilane, vinyl trimethoxysilane, γ-chloropropylmethyl dimethoxysilane, γ-chloropropyl trimethoxysilane, glycidoxypropyl trimethoxysilane, γ-methacryloxypropyl trimethoxysilane and γ-methacryloxy-propylmethyl dimethoxysilane. Examples of acid catalysts include hydrochloric acid. Examples of polyols include acrylic polyol.

Examples of methods for impregnating resin into paper include a method in which paper is immersed in a resin solution or liquid resin; a method in which a resin solution or liquid resin is coated onto paper; a resin in which resin is mixed into pulp during paper production (internal addition); and a method in which resin is sprayed onto the pulp during paper production. Here, an organic solvent such as alcohol for preventing moisture absorption by the paper is preferable for the solvent of the resin solution. In addition, in the case of coating a resin solution or liquid resin onto paper, it is preferably coated onto both sides of the paper.

The amount of resin impregnated (dry weight excluding organic solvent) is preferably 1 to 10% by mass, and more preferably 3 to 10% by mass, in the resin-impregnated paper (100% by mass) in consideration of the rigidity, productivity and ease of disposal of the resin-impregnated paper.

Resin-impregnated paper can be obtained after impregnating resin into the paper by curing, drying or solidifying the resin as necessary.

The thickness of resin-impregnated paper obtained in this manner is preferably 0.5 to 1.6 mm in consideration of optical disk strength and optical disk specifications.

(Resin-Coated Paper)

Resin-coated paper is paper in which resin has been coated and/or laminated onto the paper surface. Examples of resin-coated paper include that in which a resin solution has been coated onto the paper surface, that in which a thermoplastic resin has been laminated onto the paper surface by a molten lamination method, that in which a UV (photo)-cured resin or electron beam (EB)-cured resin is coated onto the paper surface, that in which a resin film has been laminated onto the paper surface, and that in which a resin solution has been coated onto the paper surface and a resin film is additionally laminated thereon.

There are no particular limitations on the paper of the resin-coated paper provided it is paper that uses pulp. The same paper used for the resin-impregnated paper can be used for this type of paper.

There are no particular limitations on the resin of the resin-coated paper provided it does not contain bisphenol A.

Examples of resins of resin solutions for coating include urea formaldehyde resin, melamine resin, polyamide amine and its epichlorhydrin denatured form, latexes such as natural rubber latex and synthetic rubber latexes (such as SBR, NBR, or polychloroprene), polyvinyl chloride, copolymers of vinyl chloride and other monomers, polyvinylidene chloride, copolymers of vinylidene chloride and other monomers, polyvinyl alcohol resin, polyacrylamide, acrylic resin, polyester, and polyolefins such as polyethylene and polypropylene.

Examples of thermoplastic resins used in molten lamination methods include polyethylene, polypropylene, and polyester.

Examples of UV (photo)-cured or electron beam (EB)-cured resins include epoxy acrylate, urethane acrylate, polyester acrylate, and polyether acrylate.

Examples of resin films include polyester films such as polyethylene terephthalate and polyethylene naphthalate, polyethylene, polyolefin films such as polypropylene, polystyrene film, polyamide film, polyvinyl chloride film, polyacrylnitrile film, polyamide film, polylactic acid film, triacetylcellulose film, and cyclic polyolefin film.

Resin-coated paper can be obtained after coating and/or laminating resin onto the paper surface by curing, drying or solidifying the resin as necessary.

The thickness of resin-coated paper obtained in this manner is preferably 0.5 to 1.6 mm in consideration of optical disk strength and optical disk specifications.

(Surface Smoothness)

Substrate 11 is required to have surface smoothness in order to use as an optical disk. The centerline average roughness Ra (JIS B 0601) of at least one side of substrate 11 is preferably 0.5 µm or less, and the maximum roughness Rmax (JIS B 0601) is preferably 6.0 µm or less. In addition, it is particularly preferable that the centerline average roughness Ra and maximum roughness Rmax of both sides of substrate 11 be within the aforementioned ranges.

Examples of methods for imparting surface smoothness to substrate 11 include a method in which a resin film having superior smoothness is laminated on the surface of the paper, a method in which surface transfer of a material having superior surface smoothness (such as glass, film, ceramics or metal) is carried out after impregnating or coating resin onto the paper, and a method in which resin-impregnated paper or resin-coated paper is hot-pressed.

(Peripheral Edge Protection)

Deformation prevention effects can be maintained by protective treatment of the peripheral edges of substrate 11. The peripheral edges of substrate 11 are protected by resin coating or by attaching a resin cover. Examples of resins used in the case of resin coating include urea formaldehyde resin, melamine resin, polyamide amine and its epichlorhydrin denatured form, latexes such as natural rubber latex and synthetic rubber latex such as SBR, NBR and polychloroprene, polyvinyl chloride, copolymers of vinyl chloride and other monomers, polyvinylidene chloride, copolymers of vinylidene chloride and other monomers, polyvinyl alcohol resin, polyacrylamide, acrylic resin, polyester, and polyolefins such as polyethylene and polypropylene.

Examples of resins of resin covers include polyolefins such as polyethylene and polypropylene, polyvinyl chloride, copolymers of vinyl chloride and other monomers, polyvinylidene chloride, copolymers of vinylidene chloride and other monomers, polystyrene, ABS plastic, methacrylic resin, epoxy resin, unsaturated polyester resin, phenol resin and melamine resin.

<Recording Layer>

Recording layer 13 is a layer on which information is recorded and/or a layer on which information can be recorded, and is able to record and/or read information by being irradiated with light.

Recording layer 13 includes that on which information has been recorded in advance at the time of optical disk production, and that on which information can be recorded after production, and is normally classified into one of three types consisting of: (1) that on which information is recorded in advance at the time of optical disk production but on which information cannot be recorded after production (playback-only type); (2) that on which information is not recorded at the time of optical disk production but on which information can be recorded after production (write-once type); and, (3) that from which recorded information can be erased and on which information can be re-recorded (rewritable type).

The following provides a detailed explanation of each type of recording layer.

(Playback-Only Type)

Figure 2:
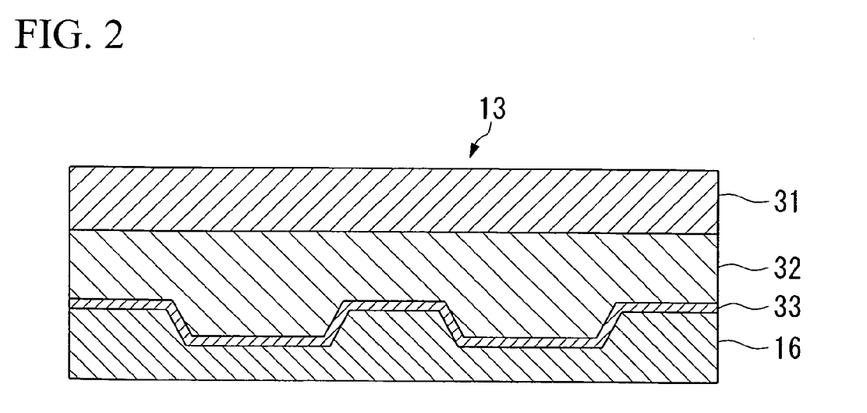
FIG. 2 is a schematic cross-sectional view showing an example of a recording layer in a playback-only optical disk.

FIG. 2 is a cross-sectional view showing an example of a playback-only type of recording layer. This recording layer 13 is roughly composed having a recording layer base material 31, an information pit forming layer 32 having irregularities in its surface formed on recording layer base material 31, and a light reflecting layer 33 that covers the surface irregularities of information pit forming layer 32, and the side having recording layer base material 31 contacts a pressure-sensitive adhesive layer 12 (not shown), while the side having light reflecting layer 33 contacts a pressure-sensitive adhesive layer 16.

Recording layer base material 31 serves as a support of recording layer 13. A resin film is normally used for recording layer base material 31. There are no particular limitations on the resin film provided it is a film composed of a resin that does not contain bisphenol A. The resin film is preferably a non-hydrophilic film in consideration of suppressing the water absorption and moisture absorption of substrate 11.

Preferable examples of a non-hydrophilic film in particular include polyolefin films composed of low density polyethylene (LDPE), linear low density polyethylene (LLDPE), high density polyethylene (HDPE), polypropylene, non-crystalline cyclic polyolefins, tetracyclododecene polymers or cycloolefin polymers in consideration of enabling disposal by incineration and minimal effects on the environment as a result of being decomposed into water and carbon dioxide by incineration.

In addition, a biodegradable resin film is preferable for the non-hydrophilic film in consideration of minimal effects on the environment as a result of being decomposed by microbes in the soil and so forth even if disposed directly. Polylactic acid resin, for example, can be used as a biodegradable resin. Examples of polylactic acid resins include "Ecoloju" manufactured by Mitsubishi Plastics Inc., "Terramac" manufactured by Unitika, Ltd., and "Palgreen LC" manufactured by Tohcello Co., Ltd. In addition, copolymer polyesters of polyvalent alcohols such as 1,4-butadiol and pentaerythritol, and succinic acid or adipic acid, for example, can also be used as biodegradable resins. Examples of this type of biodegradable polyester resins include "Biomax" manufactured by DuPont and "Bionolle" manufactured by Showa High Polymer Co., Ltd.

The thickness of the resin film is preferably 30 μm or more in consideration of maintaining the strength of a support.

Information pit forming layer 32 has irregularities in its surface, and tracks and information pits are represented by these surface irregularities. Information pit forming layer 32 is the result of curing an ultraviolet-cured resin in which a photoinitiator is combined with an oligomer or monomer such as urethane acrylate oligomer, polyester acrylate oligomer or low-viscosity acrylic monomer; and curing an electron beam-cured resin such as urethane-denatured acrylate resin and acrylic-denatured polyester resin. However, it is preferable not to use an epoxy resin that contains bisphenol A.

The thickness of information pit forming layer 32 is normally 20 to 80 nm.

Light reflecting layer 33 is provided along the surface irregularities of information pit forming layer 32 and reflects irradiated light. Light reflecting layer 33 is a thin film composed of a metal such as aluminum, aluminum alloy, silver or silver alloy formed by, for example, vacuum deposition or sputtering.

The thickness of light reflecting layer 33 is normally 10 to 100 nm, and the thickness is preferably uniform.

(Write-Once Type)

Figure 3:
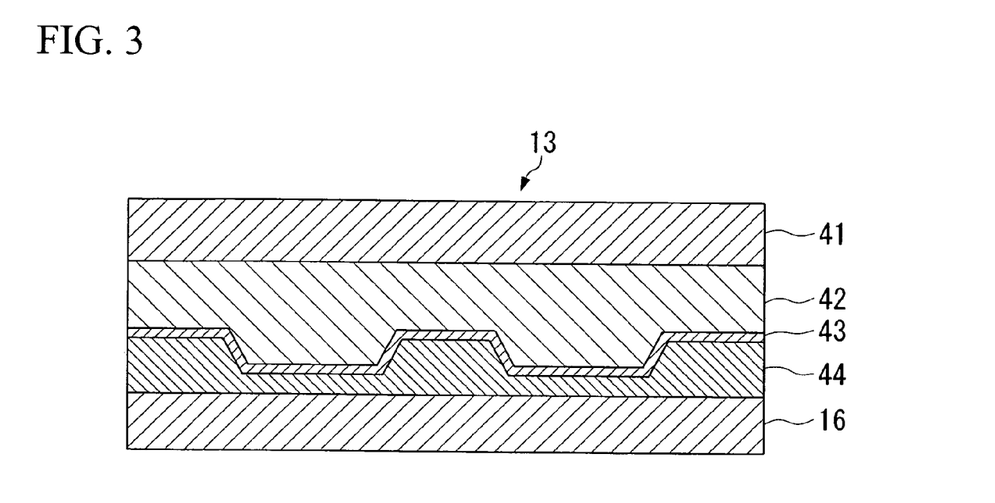
FIG. 3 is a schematic cross-sectional view showing an example of a recording layer in a write-once optical disk.

FIG. 3 is a cross-sectional view showing an example of a write-once type of recording layer. This recording layer 13 is roughly composed having a recording layer base material 41, an information track forming layer 42 having irregularities in its surface formed on the surface of recording layer base material 41, a light reflecting layer 43 that covers the surface irregularities of information track forming layer 42, and information pit recording layer 44 formed on the surface of light reflecting layer 43, and the side of recording layer base material 41 contacts a pressure-sensitive adhesive layer 12 (not shown), while the side of information pit recording layer 44 contacts a pressure-sensitive adhesive layer 16.

Recording layer base material 41 serves as a support of recording layer 13. The same resin films as the aforementioned recording layer base material 31 can be used for recording layer base material 41.

Information track forming layer 42 has irregularities in its surface having a depth of 50 to 110 nm, and tracks are represented by these surface irregularities. However, differing from a playback-only type, information pits are not formed. A cured ultraviolet-cured resin or electron beam-cured resin can be used in the same manner as the aforementioned information pit forming layer 32 for information track forming layer 42.

Light reflecting layer 43 is provided along the surface irregularities of information track forming layer 42, and reflects irradiated light. Light reflecting layer 43 is a metal thin film formed by vacuum deposition or sputtering in the same manner as the aforementioned light reflecting layer 33.

Information pit recording layer 44 is a colored film composed of, for example, an organic pigment, and as a result of being irradiated with laser light for information recording, this portion becomes information pits where information signals are recorded as a result of undergoing a physical change (destruction) following the occurrence of a change in the molecular structure of organic pigment at the irradiated site. Since the site where the physical change has occurred decreases in optical transmittance, when irradiated with light for reading, the amount of reflected light from light reflecting layer 43 decreases, and as a result, information signals can be detected in the same manner as in the case of surface irregularity pits being formed.

Examples of organic pigments include phthalocyanine pigment, naphthalocyanine pigment, and naphthoquinone pigment.

The thickness of information pit recording layer 44 is normally 50 to 200 nm.

(Rewritable Type)

Figure 4:
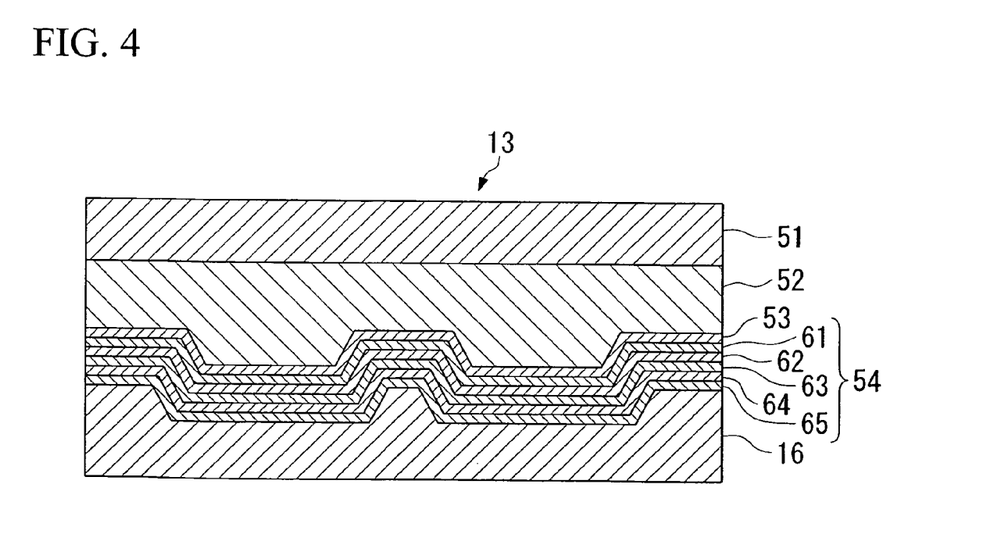
FIG. 4 is a schematic cross-sectional view showing an example of a recording layer in a rewritable optical disk.

FIG. 4 is a cross-sectional view showing an example of a rewritable type of recording layer. This recording layer 13 is roughly composed having a recording layer base material 51, an information track forming layer 52 having irregularities in its surface formed on the surface of recording layer base material 51, a light reflecting layer 53 that covers the surface irregularities of information track forming layer 52, and an information pit forming layer 54 formed on the surface of light reflecting layer 53, and the side of recording layer base material 51 contacts a pressure-sensitive adhesive layer 12 (not shown), while the side of information pit recording layer 54 contacts a pressure-sensitive adhesive layer 16.

Recording layer base material 51 serves as a support of recording layer 13. The same resin films as the aforementioned recording layer base material 31 can be used for recording layer base material 51.

Information track forming layer 52 has irregularities in its surface having a depth of 50 to 110 nm, and tracks are represented by these surface irregularities. However, differing from a playback-only type, information pits are not formed. A cured ultraviolet-cured resin or electron beam-cured resin can be used in the same manner as the aforementioned information pit forming layer 32 for information track forming layer 52.

Light reflecting layer 53 is provided along the surface irregularities of information track forming layer 52, and reflects irradiated light. Light reflecting layer 53 is a metal thin film formed by vacuum deposition or sputtering in the same manner as the aforementioned light reflecting layer 33.

Information pit recording layer 54 is a transparent dielectric film composed of three layers consisting of, for example, an $SiO_2$ film, GeSbTe film and $SiO_2$ film, and the information pit recording layer shown in the drawing has a bilayer structure laminated in the order of $SiO_2$ film 61, GeSbTe film 62, $SiO_2$ film 63, GeSbTe film 64 and $SiO_2$ film 65.

The recording, erasure and reading of information by information pit recording layer 54 is carried out in the manner described below.

Laser light is focused on a GeSbTe layer to heat this layer followed by rapid cooling to record information by polycrystallizing or decrystallizing the GeSbTe film. Laser light that is weak enough not to affect the GeSbTe film is irradiated, the laser light penetrates the polycrystallized or decrystallized GeSbTe film, and the light reflected by the light reflecting layer is received allowing information to be read depending on whether or not there is crystallization of the GeSbTe film. On the other hand, information is erased by crystallizing the GeSbTe film as a result of focusing laser light of a lower intensity onto a polycrystallized or decrystallized GeSbTe film to slowly heat the film. This recording and erasure is reversible, and different information can again be recorded after a recording has been erased.

A $ZnS$—$SiO_2$ film, $Ta_2O_5$ film, SiN film or AlN film can be used instead of an $SiO_2$ film. In addition, an AgInSbTe film can be used instead of a GeSbTe film.

Each of these films can be formed by sputtering, vacuum deposition and so forth.

The thickness of each film is roughly 10 to 300 nm, and should be suitably set according to the type and number of layers. For example, the thickness of each film of information pit recording layer 54 is 220 nm for the $SiO_2$ film, 13 nm for the GeSbTe film, 25 nm for the $SiO_2$ film, 40 nm for the GeSbTe film and 95 nm for the $SiO_2$ film in that order.

<Printing Layer>

Printing layer 15 is formed by printing by printing ink 22 on printing base material 21. Here, although printing is carried out on the side of pressure-sensitive adhesive layer 14, namely the back side of printing base material 21, this is preferable since in addition to being able to protect the printed surface composed of printing ink 22, unique images having both luster and depth can be obtained.

A resin film is normally used for printing base material 21. There are no particular limitations on the resin film provided it is a film that does not contain bisphenol A. A non-hydrophilic film is preferable for the resin film since it suppresses water absorption and moisture absorption of substrate 11.

Preferable examples of a non-hydrophilic film in particular include polyolefin films in consideration of enabling disposal by incineration and minimal effects on the environment as a result of being decomposed into water and carbon dioxide by incineration. In addition, a biodegradable resin film is preferable for the non-hydrophilic film in consideration of minimal effects on the environment as a result of being decomposed by microbes in the soil and so forth even if disposed of directly.

The same films as those used in the aforementioned recording layer base material 31 can be used for the polyolefin film and biodegradable resin film.

The thickness of printing base material 21 is normally 12 to 80 μm.

There are no particular limitations on printing ink 22 provided it does not contain bisphenol A. An example of printing ink 22 is a printing ink having a biodegradable resin such as polylactic acid resin as a binder while also containing various types of additives in consideration of minimal effects on the environment during disposal. Examples of additives include coloring pigments, pigment dispersants and viscosity adjusters.

Examples of characters and images formed by printing include markings that at least indicate the type of optical disk, additional information relating to the optical disk (such as manufacturer, retailer, price, storage capacity and usage precautions), and full-color decorative images having intermediate gradations (such as images of the recorded information). In addition, an area enabling the writing of additional information with a pencil, ballpoint pen or ink jet printer and so forth may also be provided.

<Protective Layer>

Protective layer 17 protects the surface of recording layer 13 and prevents damage to the recording layer. In addition, protective layer 17 also fulfills the role of suppressing water absorption and moisture absorption of substrate 11.

Since it is necessary for protective layer 17 to allow light irradiated onto the optical disk to penetrate to recording layer 13, it is preferably a resin film having high optical transmittance. In addition, preferable examples of resin films include polyolefin films and biodegradable resin films in consideration of minimal effects on the environment during disposal.

The same films used for the aforementioned recording layer base material 31 can be used for the polyolefin film and biodegradable resin film.

The thickness of protective layer 17 is normally 0.03 to 1.0 mm, and preferably 0.1 to 0.6 mm.

Furthermore, protective layer 17 may be composed by directly coating a liquid ultraviolet-cured resin, electron beam-cured resin, and so forth onto recording layer 13 by spin coating without using a pressure-sensitive adhesive layer 16 to be described later, followed by the curing thereof.

<Pressure-Sensitive Adhesive Layers>

Pressure-sensitive adhesive layers 12, 14 and 16 are for laminating each layer, and are layers composed of a pressure-sensitive adhesive. Acrylic pressure-sensitive adhesives and other known pressure-sensitive adhesives can be used for the pressure-sensitive adhesive.

The amount of pressure-sensitive adhesive should be suitably determined according to the material of each layer to be laminated. It is preferable that pressure-sensitive adhesive layer 12 laminated between substrate 11 and recording layer 13 have a smooth surface on the side of recording layer 13.

<Release Layers>

Figure 5:
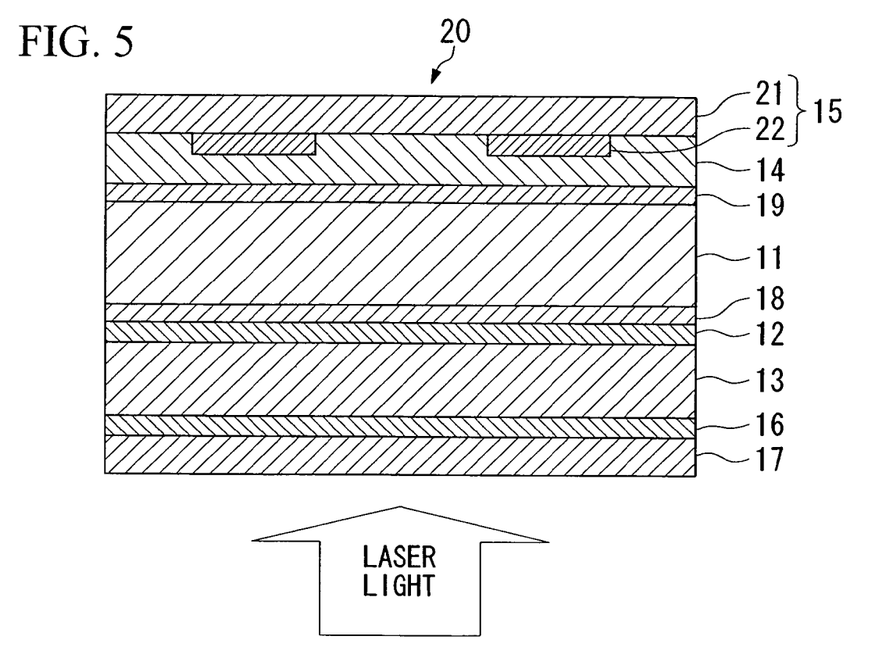
FIG. 5 is a schematic cross-sectional view showing another example of an optical disk of the present invention.

As shown in FIG. 5, an optical disk of the present invention may be an optical disk 20 in which release layers 18 and 19 are provided between substrate 11 and recording layer 13 and between substrate 11 and printing layer 15 for separation of each layer during disposal.

Release layers 18 and 19 are preferably made of materials having low levels of surface activity, examples of which include polyolefins such as polyethylene and polypropylene.

The thickness of release layers 18 and 19 is normally 5 µm to 1 mm.

<Optical Disk Production Process>

The following provides an explanation of a process for producing an optical disk of the present invention.

Figure 6:
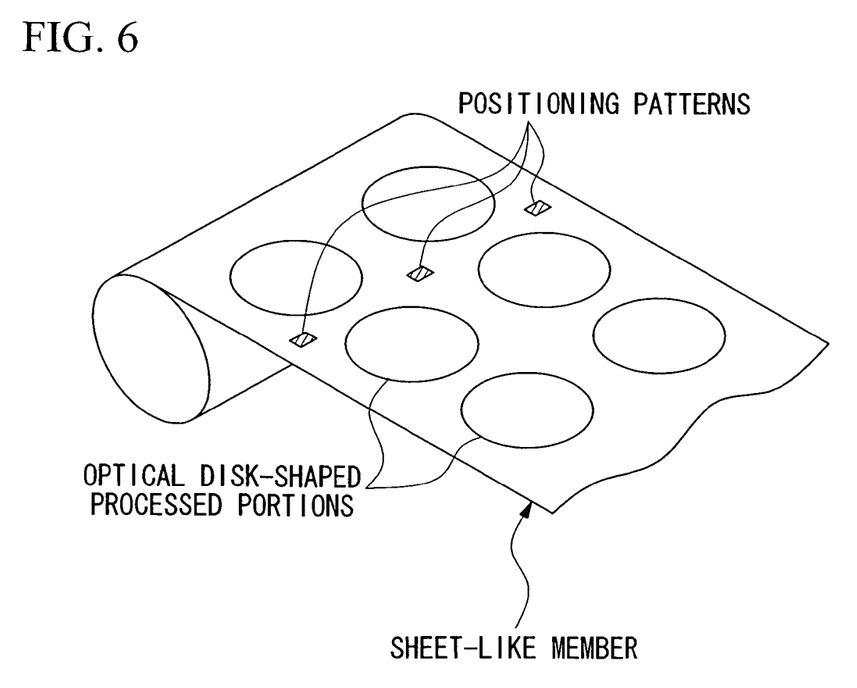
FIG. 6 is a schematic drawing showing a printing sheet and a recording sheet.

An optical disk production process of the present invention is a process for producing an optical disk consisting of producing a printing layer, substrate, recording layer and protective layer separately with each sheet-like member wound as shown in FIG. 6, coating a pressure-sensitive adhesive in a predetermined order in the final step, and then pressing and laminating them together to obtain the desired layer composition followed by punching out into the shape of a disk.

The following provides an explanation of an example of a production process of optical disk 20 having the layer composition shown in FIG. 5.

A printing sheet is fabricated in advance by printing onto printing base material 21 (printing sheet fabrication step), release layers 18 and 19 are formed on both sides of resin-impregnated paper (release layer formation step), and a recording layer sheet is fabricated by forming tracks on recording layer base material 31 (41 or 51) (recording layer sheet fabrication step). Next, a printing layer 15 composed of the printing sheet is provided on substrate 11 composed of resin-impregnated paper by laminating resin-impregnated paper and the aforementioned printing sheet (printing sheet lamination step), recording layer 13 composed of the printing layer sheet is provided on substrate 11 composed of resin-impregnated paper by laminating resin-impregnated paper and the aforementioned recording layer sheet (recording layer sheet lamination step), and protective layer 17 composed of a protective film is provided on recording layer 13 by laminating a protective film on recording layer 13 (protective film lamination step) to form a roll having the desired layer composition followed by punching out said roll into the shape of disks to produce optical disk 20.

<Printing Sheet Fabrication Step>

Figure 7A:
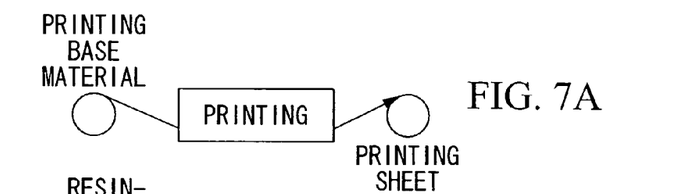

A printing sheet is fabricated by carrying out printing by printing ink 22 on printing base material 21 according to the step shown in FIG. 7A followed by winding onto a roller. At this time, positioning patterns are printed onto the printing sheet as shown in FIG. 6.

Examples of printing methods include offset printing, gravure printing, relief printing, screen printing, ink jet printing and electrophotography. Offset printing or gravure printing is particularly preferable in the case of full-color printing having intermediate gradations since these methods allow the obtaining of high-definition images. In addition, ink jet printing or electrophotography is preferable in the case of imparting variable information that differs for each disk.

<Release Layer Formation Step>

Figure 7B:
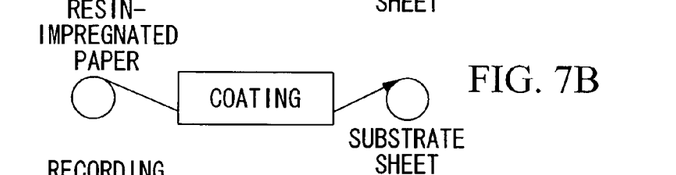

Release layers 18 and 19 are formed in advance on resin-impregnated paper serving as substrate 11 by molten extrusion coating of a polyolefin such as polyethylene onto both of its sides according to the step shown in FIG. 7(*b*). The resin-impregnated paper on which release layers 18 and 19 are formed (to also be referred to as a substrate sheet) is wound into the shape of a roll.

<Recording Layer Sheet Fabrication Step>

Figure 7C:
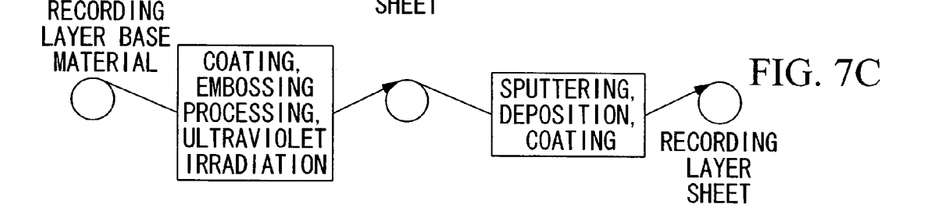

A recording layer sheet is fabricated by forming tracks on recording layer base material 31 (41 or 51), forming various layers respectively corresponding to a playback-only type, write-once type or rewritable type, and winding into the shape of a roll according to the step shown in FIG. 7(*c*). At this time, positioning patterns (surface irregularities and so forth) are formed in the printing layer sheet as shown in FIG. 6.

(Playback-Only Type)

First, an ultraviolet-cured resin is coated onto recording layer base material 31, and a transfer mold having surface irregularities corresponding to tracks and information pits is pressed against its surface to transfer the surface irregularities to the surface of the ultraviolet-cured resin (embossing processing). Next, the ultraviolet-cured resin is cured by irradiating with ultraviolet light to form information pit forming layer 32. At this time, by using a transfer mold having a diffraction grating pattern or hologram pattern in addition to the surface irregularities corresponding to tracks and information pits for the transfer mold, an anti-theft or other pattern can also be formed on information pit forming layer 32.

Next, light reflecting layer 33 composed of a metal thin film is formed on information pit forming layer 32 by vacuum deposition or sputtering.

(Write-Once Type)

The formation of information track forming layer 42 and light reflecting layer 43 is carried out in the same manner as information pit forming layer 32 and light reflecting layer 33 of the playback-only type. However, a transfer mold that does not have surface irregularities corresponding to information pits is used for the transfer mold.

Next, an organic pigment is coated onto light reflecting layer 43 to form information pit recording layer 44 composed of an organic pigment colored film. Examples of coating methods include gravure coating, microgravure coating, die coating, comma coating, air knife coating and roll coating.

(Rewritable Type)

The formation of information track forming layer 52 and light reflecting layer 53 is carried out in the same manner as the write-once type.

Next, $SiO_2$ film 61, GeSbTe film 62, $SiO_2$ film 63, GeSbTe film 64 and $SiO_2$ film 65 are sequentially formed on light reflecting layer 53 by sputtering or vacuum deposition.

<Lamination Steps>

Figure 8:
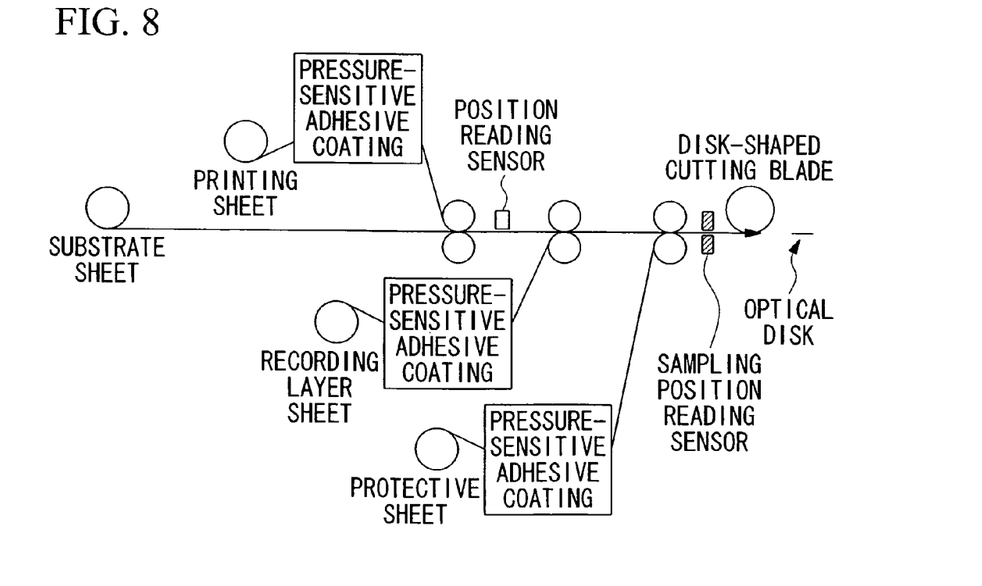
FIG. 8 is a schematic drawing showing the lamination steps for each sheet.

As shown in FIG. 8, a pressure-sensitive adhesive is first coated on the printed side of a printing sheet, and this is laminated with a substrate sheet (resin-impregnated paper on which a release layer is formed).

Next, a pressure-sensitive adhesive is coated onto a recording layer sheet and this is laminated onto the other side of the substrate sheet to which the printing sheet has been laminated. At this time, the printing sheet and recording layer sheet are positioned by reading the positioning patterns on the printing sheet and the positioning patterns on the recording layer sheet with a position reading sensor.

Next, a pressure-sensitive adhesive is coated onto a protective sheet, and this is laminated onto recording layer 13 on the substrate sheet to form an optical disk roll.

<Punching Step>

Next, the optical disk-shaped processed portions of the roll are synchronized with a disk-shaped cutting blade by reading the positioning patterns with a sampling position reading sensor, and then roll is punched out in the shape of disks with the disk-shaped cutting blade to obtain optical disks.

Optical disks obtained in this manner can be deformed depending on the material of each layer. Accordingly, in order to ensure smoothness, a step may be inserted in which warping of the roll is removed by heating the optical disks from both sides with a flat heating plate.

In addition, the shape of the peripheral edges of the optical disks can be changed in order to sustain the effect of preventing changes caused by environmental changes. The peripheral edge of an optical disk is formed to be curved so that the protective layer and so forth covers the peripheral edge of substrate 11 within a range that does not affect the recording area of the recording layer. The formation of this curvature can be carried out by a method such as using a disk-shaped cutting blade that is able to curve the peripheral edge when punching out the optical disk from the roll, or by a method in which the periphery of the optical disk is pressed to form a curve after being punched out. As a result of forming this curvature, the area over which the peripheral edge of substrate 11 contacts the outside air can be reduced along the peripheral edge of the optical disk, thereby making it possible to further sustain the effect of preventing deformation of the optical disk.

In an optical disk of the present invention as has been explained above, since resin-impregnated paper or resin-coated paper is used for substrate 11, it can be disposed of easily by incineration or burying underground, and there is only a minimal effect on the environment at that time. In addition, in an optical disk of the present invention, since resin-impregnated paper or resin-coated paper is used for substrate 11, the optical disk has the required strength for use as an optical disk as a result of the paper functioning as a reinforcing material, and since the paper is in the state of being impregnated with resin or the surface of the paper is in the state of being coated with resin, it is resistant to absorption of water and moisture, has superior dimensional stability and demonstrates little warping.

In addition, since printing layer 12 is additionally provided on the side of substrate 11 opposite from the side on which recording layer 13 is provided, both sides of substrate 11 are covered, thereby making it possible to further suppress water absorption and moisture absorption by substrate 11, as well as further suppress warping and other deformation of the optical disk.

Action similar to this is also demonstrated even in the case recording layer 13 is provided on both sides of the substrate.

In addition, since protective layer 17 that protects recording layer 13 is additionally provided, together with preventing recording layer 13 from being damaged, water absorption and moisture absorption by substrate 11 can be further suppressed, thereby making it possible to further suppress warping and other deformation of the optical disk.

In addition, if recording layer 13 has a recording layer base material 31 (41 or 51) composed of a non-hydrophilic film, water absorption and moisture absorption of substrate 11 can be further suppressed, thereby making it possible to further suppress warping and other deformation of the optical disk.

In addition, if printing layer 15 is provided with printing base material 21 composed of a non-hydrophilic film, then the water absorption and moisture absorption of substrate 11 can be further suppressed, thereby making it possible to further suppress warping and other deformation of the optical disk.

In addition, since release layers 18 and 19 are provided between substrate 111 and recording layer 13 and between substrate 11 and printing layer 15, substrate 11, recording layer 13 and printing layer 15 can be separated at the time of disposal and disposed of separately, thereby enabling disposal corresponding to the material of each layer and making it possible for further reduce the effects on the environment.

In addition, in an optical disk production process of the present invention, since substrate 11, recording layer 13, printing layer 15 and protective layer 17 are formed by fabricating their corresponding sheets in advance followed by laminating those sheets, differing from coating by spin coating and so forth, there is less material waste, and differing from the case of preliminarily laminating each layer that composes printing layer 13, recording layer 15 and protective layer 17 on a substrate in order, an optical disk having little warping of substrate 11 can be produced inexpensively without being subjected to stress caused by differences in the coefficients of thermal expansion.

In addition, since a method is employed in which printing is carried out in advance on printing base material 21 to fabricate a printing sheet followed by laminating this onto substrate 11, high-definition printing can be carried out, and highly detailed images can be obtained inexpensively. In addition, serial numbers and other variable information that differs for each disk can be printed onto an optical disk in the aforementioned printing sheet fabrication step.

Furthermore, an optical disk of the present invention is not limited to that described in the aforementioned embodiments, but rather the design and so forth may be altered within a range that does not deviate from the gist of the present invention.

For example, an optical disk of the present invention is not limited to a disk shape, but may be rectangular or any other arbitrary shape provided the region where information is recorded is circular.

In addition, although a pressure-sensitive adhesive is used when laminating each layer in the aforementioned embodiments, an adhesive layer, adhesive material, or a pressure-sensitive adhesive material in which a pressure-sensitive adhesive or adhesive has been formed into the shape of a sheet may also be used for the pressure-sensitive adhesive.

In addition, in the aforementioned optical disk production example, although the substrate sheet was wound into a roll, in the case of being wound into a roll, there are cases in which warping occurs in the substrate and the optical disk becomes susceptible to deformation. Accordingly, the substrate sheet may also be in the form of a flat sheet free of curling instead of a wound roll.

EXAMPLES

The following indicates examples of the present invention.

Example 1

(Fabrication of Printing Sheet)

Gravure printing was carried out using biodegradable polyester printing ink (Dainichiseika Color and Chemicals, Biotech Color HGP) on a polylactic acid film drawn to a thickness of 0.04 mm (Mitsubishi Plastics, Ecoloju) to obtain a printing sheet on which was printed markings indicating the type of optical disk, additional information relating to the optical disk, decorative images and so forth.

(Fabrication of Substrate Sheet)

Polyethylene was molten extrusion coated onto both sides of resin-impregnated paper having a thickness of 1.0 mm (Hokuetsu Paper Mills, water-resistant vulcanized fiber) followed by preliminarily forming a release layer having a thickness of 0.015 mm.

(Fabrication of Recording Layer Sheet)

Surface irregularities corresponding to tracks and information pits were transferred to a copper-plated roll after which the roll was chrome-plated from above to obtain a transfer mold.

An ultraviolet-cured resin was coated onto a high-density polyethylene film drawn to a thickness of 0.05 mm with a die coater to a thickness of 0.1 mm, and the transfer mold was pressed against its surface to transfer the surface irregularities to the surface of the ultraviolet-cured resin.

Next, the ultraviolet-cured resin was irradiated with ultraviolet light to cure the ultraviolet-cured resin and form tracks.

Next, aluminum was vacuum deposited on the tracks and a light reflecting layer having a thickness of 60 nm was formed to obtain a playback-only type of recording layer sheet.

(Lamination)

An acrylic pressure-sensitive adhesive was coated onto the printed surface of the printing sheet to a thickness of 0.005 mm by microgravure coating after which it was laminated with the substrate sheet.

Next, an acrylic pressure-sensitive adhesive was coated on the recording layer sheet to a thickness of 0.005 mm by microgravure coating after which it was laminated onto the other side of the substrate sheet to which the printing sheet had been laminated.

Next, an acrylic pressure-sensitive adhesive was coated onto a protective sheet (high-density polyethylene film drawn to a thickness of 0.065 mm) to a thickness of 0.005 mm by microgravure coating after which it was laminated onto the substrate sheet to obtain an optical disk roll.

(Punching)

Next, the optical disk roll was punched into the shape of disks using a disk-shaped cutting blade to obtain optical disks. The optical disks were subsequently placed between flat plates followed by the application of heat at 50° for 24 hours to remove any warping and obtain smooth optical disks.

(Evaluation)

When information recorded on the resulting optical disks was read using an optical disk drive manufactured by Pulstec Industrial Co., Ltd. (product name: DDU-1000), the information was able to be read without problem.

In addition, the substrate (+release layer), recording layer (+pressure-sensitive adhesive layer+protective layer) and printing layer (+pressure-sensitive adhesive layer) were able to be separated, and the substrate and printing layer were able to be disposed of by burying underground. The protective layer was able to be further separated from the recording layer (+pressure-sensitive adhesive layer+protective layer), and the protective layer was able to be disposed of by burying underground. The metal thin film component was recovered from the recording layer.

Example 2

With the exception of changing the fabrication of the recording layer sheet as described below, optical disks were obtained in the same manner as Example 1.

(Fabrication of Recording Layer Sheet)

Surface irregularities corresponding to tracks and information pits were transferred to a copper-plated roll after which the roll was chrome-plated from above to obtain a transfer mold.

An ultraviolet-cured resin was coated onto a high-density polyethylene film drawn to a thickness of 0.05 mm with a die coater to a thickness of 0.1 mm, and the transfer mold was pressed against its surface to transfer the surface irregularities to the surface of the ultraviolet-cured resin.

Next, the ultraviolet-cured resin was irradiated with ultraviolet light to cure the ultraviolet-cured resin and form tracks.

Next, aluminum was vacuum deposited on the tracks and a light reflecting layer having a thickness of 60 nm was formed.

Next, a cyanine pigment was coated onto the light reflecting layer by microgravure coating to form a colored film having a thickness of 60 nm and obtain a write-once type of recording layer sheet.

(Evaluation)

When information was recorded (writing) and information recorded on the resulting optical disks was read using an optical disk drive manufactured by Pulstec Industrial Co., Ltd. (product name: DDU-1000), the information was able to be recorded and read without problem.

In addition, the substrate (+release layer), recording layer (+pressure-sensitive adhesive layer+protective layer) and printing layer (+pressure-sensitive adhesive layer) were able to be separated, and the substrate and printing layer were able to be disposed of by burying underground. The protective layer was able to be further separated from the recording layer (+pressure-sensitive adhesive layer+protective layer), and the protective layer was able to be disposed of by burying underground. The metal thin film component was recovered from the recording layer.

Example 3

With the exception of changing the fabrication of the recording layer sheet as described below, optical disks were obtained in the same manner as Example 1.

(Fabrication of Recording Layer Sheet)

Surface irregularities corresponding to tracks were transferred to a copper-plated roll after which the roll was chrome-plated from above to obtain a transfer mold.

An ultraviolet-cured resin was coated onto a high-density polyethylene film drawn to a thickness of 0.05 mm with a die coater to a thickness of 0.1 mm, and the transfer mold was pressed against its surface to transfer the surface irregularities to the surface of the ultraviolet-cured resin.

Next, the ultraviolet-cured resin was irradiated with ultraviolet light to cure the ultraviolet-cured resin and form tracks.

Next, aluminum was vacuum deposited on the tracks and a light reflecting layer having a thickness of 60 nm was formed.

Next, an $SiO_2$ film having a thickness of 220 nm, a GeSbTe film having a thickness of 13 μm, an $SiO_2$ film having a thickness of 25 nm, a GeSbTe film having a thickness of 40 nm and an $SiO_2$ film having a thickness of 95 nm were sequentially formed by sputtering on the light reflecting layer to obtain a rewritable type of recording layer sheet.

(Evaluation)

When information was recorded (writing), information recorded on the resulting optical disks was read, the recorded information was erased and information was then rewritten using an optical disk drive manufactured by Pulstec Industrial Co., Ltd. (product name: DDU-1000), the information was able to be recorded, read, erased and rewritten without problem.

In addition, the substrate (+release layer), recording layer (+pressure-sensitive adhesive layer+protective layer) and printing layer (+pressure-sensitive adhesive layer) were able to be separated, and the substrate and printing layer were able to be disposed of by burying underground. The protective layer was able to be further separated from the recording layer (+pressure-sensitive adhesive layer+protective layer), and the protective layer was able to be disposed of by burying underground. The metal thin film component was recovered from the recording layer.

Example 4

Figure 9:
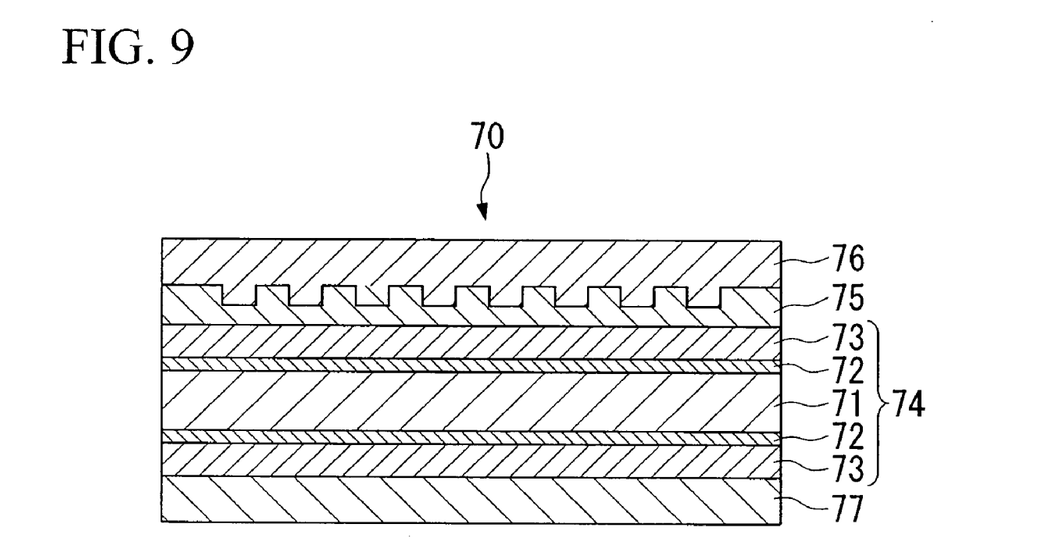
FIG. 9 is a schematic cross-sectional view showing another example of an optical disk of the present invention.

An optical disk 70 was fabricated having a substrate 74, in which resin films 73 were laminated onto both sides of paper 71 with adhesive layers 72 interposed between, a recording layer 75 laminated onto one side of substrate 74 with a pressure-sensitive adhesive layer (not shown) interposed between, a protective layer 76 laminated onto recording layer 75 with a pressure-sensitive adhesive layer (not shown) interposed between, and a protective layer 77 laminated onto the other side of substrate 74 with a pressure-sensitive adhesive layer (not shown) interposed between as shown in FIG. 9. The following provides a detailed explanation of this optical disk 70.

(Fabrication of Substrate Sheet)

Adhesive layers composed of a pressure-sensitive adhesive were provided on both sides of paper having a thickness of 0.6 mm followed by the lamination of a resin film thereon having a thickness of 0.18 mm to fabricate a substrate sheet having a thickness of 1.1 mm.

(Fabrication of Recording Layer Sheet)

Surface irregularities corresponding to tracks and information pits were transferred to a copper-plated roll after which the roll was chrome-plated from above to obtain a transfer mold.

An ultraviolet-cured resin was coated onto a high-density polyethylene film drawn to a thickness of 0.05 mm with a die coater to a thickness of 0.1 mm, and the transfer mold was pressed against its surface to transfer the surface irregularities to the surface of the ultraviolet-cured resin.

Next, the ultraviolet-cured resin was irradiated with ultraviolet light to cure the ultraviolet-cured resin and form tracks.

Next, aluminum was vacuum deposited on the tracks and a light reflecting layer having a thickness of 60 nm was formed to obtain a playback-only type of recording layer sheet.

(Lamination)

An acrylic pressure-sensitive adhesive was coated onto the recording layer sheet to a thickness of 0.005 mm by microgravure coating after which it was laminated onto the other side of the substrate sheet to which a printing sheet had been laminated.

Next, an acrylic pressure-sensitive adhesive was coated onto a protective sheet (high-density polyethylene film drawn to a thickness of 0.065 mm) to a thickness of 0.005 mm by microgravure coating after which it was laminated onto the recording layer of the substrate sheet.

Moreover, an acrylic pressure-sensitive adhesive was coated onto a protective sheet (high-density polyethylene film drawn to a thickness of 0.065 mm) to a thickness of 0.005 mm by microgravure coating after which it was laminated onto the back of the substrate sheet to obtain an optical disk roll.

(Punching)

Next, the optical disk roll was punched into the shape of disks using a disk-shaped cutting blade to obtain optical disks. The optical disks were subsequently placed between flat plates followed by the application of heat at 50° for 24 hours to remove any warping and obtain smooth optical disks.

(Evaluation)

When information recorded on the resulting optical disks was read using an optical disk drive manufactured by Pulstec Industrial Co., Ltd. (product name: DDU-1000), the information was able to be read without problem.

INDUSTRIAL APPLICABILITY

An optical disk of the present invention, in which resin-impregnated paper in which resin is impregnated into paper, or resin-coated paper, in which the paper surface is coated with a resin, is used for the substrate is both environmentally friendly and inexpensive.

The invention claimed is:

1. An optical disk, comprising: a substrate including resin-impregnated paper in which a resin has been impregnated into paper or resin-coated paper in which paper surface has been coated with a resin; wherein a centerline average roughness Ra of at least one side of the substrate is 0.5 μm or less, and a maximum roughness Rmax is 6.0 μm or less; a recording layer provided on at least one side of the substrate wherein the recording layer has a recording layer base material that serves as a support for the recording layer, and the recording layer base material includes a non-hydrophilic film; a printing layer provided on at least one side of the substrate, having a printing base material and a printed ink applied to a surface of the printing base material facing the substrate; and at least one release layer provided between the substrate and the recording layer and/or between the substrate and the printing layer, wherein the substrate has peripheral edges protected by resin coating or by attaching a resin cover and/or by being shaped into a curve.

2. An optical disk according to claim 1, further comprising: a protective layer to protect the recording layer.

3. An optical disk according to claim 2, wherein the recording layer has a recording layer base material that serves as a support for the recording layer, and the recording layer base material includes a non-hydrophilic film.

4. An optical disk according to claim 1, wherein the at least one release layer includes a release layer provided between the substrate and the recording layer.

5. An optical disk according to claim 1, wherein the at least one release layer includes a release layer provided between the substrate and the printing layer.

6. A manufacturing method of an optical disk, comprising:
   recording layer sheet fabricating in which a recording layer sheet is fabricated by forming tracks on a recording layer base material; and
   recording layer sheet laminating in which a recording layer included in the recording layer sheet is provided on a substrate including resin-impregnated paper or resin-coated paper by laminating the recording layer sheet with resin-impregnated paper in which a resin is impregnated into paper or resin-coated paper in which the surface of the paper is coated with a resin,
   printing sheet fabricating in which a printing sheet is fabricated by carrying out printing on a printing base material; and
   printing sheet laminating in which a printing layer included in the printing sheet is provided on the substrate including the resin-impregnated paper or resin-coated paper by laminating the printing sheet with resin-impregnated paper in which a resin is impregnated into paper or resin-impregnated paper in which the surface of the paper is coated with a resin, such that the printed surface of the printing base material faces the substrate.

7. A manufacturing method of an optical disk according to claim 6, further comprising:

protective film laminating in which a protective layer included a protective film is provided on the recording layer by laminating the protective film onto the recording layer.

8. A manufacturing method of an optical disk according to any of claims 6 and 7, further comprising: release layer formation in which a release layer is formed on at least one side of the resin-impregnated paper or resin-coated paper in advance.

9. A manufacturing method of an optical disk according to any of claims 6 and 7, wherein each sheet is produced in the form of a wound roll, and each sheet in the form of a wound roll is laminated.

10. A manufacturing method of an optical disk according to claim 6, wherein the printing sheet fabrication includes printing mutually different variable information imparted to each optical disk produced on the printing base material.

11. An optical disk free of bisphenol A, comprising:

a substrate made of a resin-impregnated paper in which a resin has been impregnated into paper or a resin-coated paper in which at least one of the paper surfaces has been coated with a resin;

a recording layer on which information is recorded and read from using laser light, provided on one side of the substrate;

a printing layer provided on at least one side of the substrate, having a printing base material and a printed ink applied to a surface of the printing base material facing the substrate, to transfer printed images; and at least one release layer provided between the substrate and the recording layer and/or between the substrate and the printing layer, for separation from the substrate during disposal, wherein the substrate has peripheral edges protected by resin coating or by attaching a resin cover and/or by being shaped into a curve.

12. An optical disk according to claim 11, wherein the recording layer is one of a play-back only type of recording layer, write-once type of recording layer, and rewritable type of recording layer.

13. An optical disk according to claim 11, further comprising at least one of a protective layer covering and protecting the recording layer.

14. An optical disk according to claim 2, wherein the at least one release layer includes a release layer provided between the substrate and the recording layer.

15. An optical disk according to claim 2, wherein the at least one release layer includes a release layer provided between the substrate and the printing layer.

* * * * *